3,460,944
POLYMER COMPOSITIONS, STRATA
AND ELEMENTS
Abraham Bernard Cohen, Springfield, N.J., assignor to
E. I. du Pont de Nemours and Company, Wilmington,
Del., a corporation of Delaware
No Drawing. Continuation-in-part of application Ser. No.
363,281, Apr. 28, 1964. This application Mar. 18, 1965,
Ser. No. 440,910
Int. Cl. G03c 1/80; C09d 3/74
U.S. Cl. 96—87                                           5 Claims

ABSTRACT OF THE DISCLOSURE

Photographic film base, photographic film, and drafting film having a substratum comprising a mixture of (1) a vinyldene chloride/alkyl acrylate or methacrylate/itaconic acid copolymer, where alkyl is 1–4 carbons, and (2) a homopolymer of an alkyl acrylate or methacrylate, where alkyl is 1–14 carbon atoms and (1) and (2) are in the respective amounts by weight of 90–60 and 10–40.

---

This application is a continuation-in-part of my copending application Ser. No. 363,281 filed Apr. 28, 1964, and entitled Polymer Compositions, Strata and Elements, now abandoned.

This invention relates to polymer compositions and strata. It also relates to elements for graphic arts and photographic purposes embodying the strata. Still more particularly it relates to papers and films coated with modified vinylidene chloride copolymer dispersions and to photographic and drafting materials embodying the coatings or strata.

In the manufacture of photographic papers and films a significant improvement was made in water-proofing and anchoring techniques with the development of the processes and products described and claimed in assignee's patents, Swindells U.S. Patent 2,698,235 and Alles et al. U.S. Patents 2,627,088 and 2,698,240. These patents describe the use of vinylidene halide copolymer aqueous dispersions and particularly copolymers of vinylidene chloride with acrylic esters and itaconic acid as coatings for films and papers suitable for the application of subsequent photographic coatings, particularly colloid silver halide emulsion coatings. The vinylidene chloride copolymer coatings of these patents in some instances supply water-proof qualities to the materials on which they are coated; but, more particularly, they also supply a strong adhesive bond between the base material and subsequentially applied coatings, e.g., a gelatino-silver halide coating. Indeed, in the Alles et al. patents this is the primary function of the vinylidene chloride coatings, since many of the polyester films of those patents are substantially water-proof without added coatings.

The vinylidene chloride copolymer compositions of the Swindells and Alles et al. patents have a wide range of compositions and useful substratum coatings for a variety of photographic products have been made by varying the proportions of vinylidene chloride, acrylic ester and itaconic acid in the copolymers. However, some variations, while improving one property of the substratum have a tendency to cause deterioration of another property. Thus, in certain graphic arts applications it is desirable to have a substratum which is highly resistant to organic solvents used in staging lacquers, and this can be achieved by increasing the amount of vinylidene chloride in the substratum copolymer while reducing the amount of acrylic ester. When this is done however, there is some tendency for the dry anchorage of the substratum (particularly anchorage after exposure, processing and drying of the film) to be reduced. While the films are still useful in most applications, this effect is, nevertheless, undesirable. Other changes in copolymer composition desirable for some particular use or purpose may introduce still other problems for the film manufacturer and restrict the flexibility of his operations.

It is an object of this invention to provide improved vinylidene chloride-containing copolymer compositions for coating substratum layers on photographic base materials. It is a further object to produce improved substratum layers for polyester type film bases, particularly polyethylene terephthalate bases. It is a still further object to provide substratum layers for polyester film base materials which exhibit improved dry adhesion so that the anchorage of the emulsion to the base in the case of dry films is considerably improved. A related object is the preparation of photographic films with improved balance of physical properties. Still further objects will be apparent from the following description of the invention.

It has now been found that improved compositions, and substrata and elements bearing a stratum comprising a mixture of (a) a vinylidene chloride addition copolymer containing at least 35% by weight vinylidene chloride and preferably a vinylidene chloride/alkyl acrylate/itaconic acid polymer wherein the alkyl group contains 1–4 carbon atoms and said components are present in the respective amounts by weight 35 to 96%, 3.5 to 64.5% and 0.5 to 25% with (b) a polymer, i.e., homopolymer or copolymer of an alkyl acrylate and/or methacrylate containing at least 75% by weight of said component and having a glass transition (brittle) temperature not more than 20° C., preferably not more than 15° C., in the respective amounts by weight of 90 to 60, and 10 to 40, can be readily prepared.

In making the compositions, 90 to 60 parts of the vinylidene chloride/alkyl acrylate/itaconic acid copolymer are mixed with from 10 to 40 parts by weight of a homopolymer or copolymer of the alkyl acrylate and/or alkyl methacrylate. The concentrations of the second polymer will differ depending upon the chain length of the alkanol if used to produce the acrylate ester. With short chain alkanols of 1–4 carbons, e.g., ethanol and butanol, the maximum flexibility with good anchorage will be obtained with higher concentrations, e.g., 25–40%. With long carbon chain alkanols of 8–14 or more carbons, e.g., dodecanol or 2-ethyl hexanol, lower concentrations, e.g., 5–20%, will provide adequate flexibility, and concentrations above 25% may result in poorer coating quality and/or anchorage. For an example of typical proportions, an aqueous dispersion of (1) a copolymer prepared from 90 parts of vinylidene chloride, 10 parts of methyl acrylate, and 2 parts of itaconic acid is mixed with (2) an aqueous dispersion of polyethyl acrylate, the preferred polymer, in such proportions that the mixture contains from 96–60 parts of the former to 10–40 parts (by weight) of the latter based on the total solids of the final composition.

A convenient method of preparing such mixtures is to start with two dispersions containing the same percentage of solids and mix these in the desired proportions by volume. The mixture can then be coated on a suitable base material, e.g., amorphous polyethylene terephthalate and dried, and a biaxially stretched film prepared therefrom in the manner described in Alles U.S. Patent 2,779,684. The thus treated films can then be used as base materials for a variety of products, e.g., as a base for a drafting film of the type described in Van Stappen U.S. 2,964,423 or as a support for a photographic colloid silver halide emulsion or emulsions. As the tricomponent vinylidene chloride/acrylic ester/itaconic acid copolymer of the subbing compositions any of the copolymers described in Swindells U.S. 2,698,235 may be used, but the preferred compositions are those in which the vinylidene chloride component is in the higher range, e.g., above 75% of the total weight of copolymerizable monomers. Preferably the copolymers are made by emulsion polymerization in a manner analogous to that employed in the Swindells patent, e.g., by Procedure A which follows.

The acrylate or methacrylate homopolymers or copolymers for constituent (b) of the substratum described above, are made from monomers having 4 to 17 carbon atoms. The acrylate or methacrylate polymers are also made by emulsion polymerization as described in Procedure B which follows, or by similar procedures, e.g., as described in assignee's pending application Nottorf U.S. Ser. No. 134,109 filed Aug. 28, 1961, U.S. Pat. 3,325,286 (Belgian Patent 621,797). The added acrylate and methacrylate polymers should have good impact resistance at room temperature, be readily compatible with the vinylidene chloride substratum copolymers, and have good adhesive properties. The polymers meeting these requirements are those having a glass transition (or brittle) temperature of 20° C. and below. Homopolymers meeting these requirements include polyacrylate esters of alkanols of 1 to 14 carbon atoms and polymethacrylate esters of alkanols of 4 to 12 carbon atoms. The relationships between brittleness and glass transition temperature are discussed in "Monomeric Acrylic Esters" by E.H. Riddle, Reinhold, New York (1954) or in Rohm and Haas Bulletin SP–229, January 1963. Suitable homopolymers are polyethylhexyl acrylate, polyethyl acrylate, poly n-butyl acrylate, polyoctyl methacrylate, poly n-hexyl methacrylate, poly n-heptyl acrylate and methacrylate, etc. Of these, polyethyl acrylate is preferred for most applications because of the ready availability and economy of the raw materials. Copolymers containing substantial amounts of ethyl acrylate are also preferred.

These copolymers may contain less than 25% by weight of other monomers, e.g., other acrylate or methacrylate esters, acrylonitrile, acrylic acid, acrylamide, vinyl chloride or acetate, vinyl ether and the like provided the resulting copolymer still has a glass transition temperature below 20° C. For example, polymethyl methacrylate ($T_g=105°$ C.) would be unsuitable, but a copolymer containing 30% methyl methacrylate and 70% ethyl acrylate ($T_g=8°$ C.) would be satisfactory. A convenient formula for calculating glass transition temperatures for copolymers ($T_{co}$) was developed by T. G. Fox, Bull. Am. Phys. Soc. 1, No. 3, 123 (1956):

$$\text{``}\frac{1}{T_{co}} = \frac{W_1}{T_1} + \frac{W_1}{T_2}\text{''}$$

where $W_1$ and $W_2$ are weight fractions of the different monomers and $T_1$ and $T_2$ the glass transition of homopolymers from those monomers.

Since a preferred method of applying the vinylidene chloride copolymer resin is from an aqueous dispersion, it is desirable that the flexibilizing polymer also be in the form of a dispersion. Such dispersions can be prepared directly by emulsion polymerization or they can be prepared in bulk or solution and then dispersed in an aqueous medium. The flexibilizing dispersions should have particle sizes fine enough to give clear films when mixed with the vinylidene chloride copolymers, and should not contain surfactants which are incompatible with those used for the vinylidene chloride copolymers. They also should be free of photographically active materials such as peroxides, sulfur-containing compounds, or materials which interfere with the action of sensitizing dyes if they are to be coated with emulsions containing optical sensitizers.

The invention will now be illustrated, but is not intended to be limited, by the following procedures and examples in which all light-sensitive coatings are applied in the substantial absence of actinic light, and all parts and percentages are by weight unless otherwise specified.

PROCEDURE A

Polymerization inhibitors are removed from vinylidene chloride and methyl acrylate in the customary manner and the purified monomers were then mixed in amounts of 91 parts vinylidene chloride and 10 parts of methyl acrylate with:

| | Parts |
|---|---|
| Itaconic acid | 2 |
| Water (distilled) | 157 |
| Ammonium persulfate | 0.136 |
| Sodium metabisulfite | 0.176 |
| Sodium salt of lauryl alcohol sulfate (30% aqueous) | 6.6 |

The mixture is stirred in an atmosphere of nitrogen in a vessel provided with a reflux condenser and the temperature maintained at about 34° to 36° C. until all of of the vinylidene chloride has reacted as indicated by cessation of reflux. At this point, the temperature is raised to 40° C. for about 15 minutes and then rapidly cooled to 30° C., and 2 parts of the condensation product of sodium β-naphthalene sulfonate and formaldehyde is added with stirring to the mixture. After an additional 15 minutes stirring, the resulting dispersion is filtered through nainsook and stored in stainless steel containers. The dispersion typically will have a total solids content of 37 to 41%.

PROCEDURE B

Polymerization inhibitor is removed from ethyl acrylate in the customary manner and the purified monomer is used to prepare an emulsion of polyethyl acrylate, as follows:

In a suitable vessel 12.57 parts of a 30% aqueous solution of the sodium salt of lauryl alcohol sulfate is mixed with about 190 parts of distilled water under an atmosphere of nitrogen. To this solution there is added 10 parts of purified ethyl acrylate and the temperature is raised to 38–42° C. and held at this temperature for 10 minutes. At the end of this time, a solution of 0.41 part of ammonium persulfate in 6.3 parts of water is added and followed by 0.31 part of sodium metabisulfite in 3.14 parts of water. The mixture is held at 42–43° C. until reaction starts and the temperature allowed to rise to a maximum. As soon as the temperature starts to fall an additional 90 parts of ethyl acrylate is added at the rate of 2.3 parts per minute while the temperature is maintained between 41° and 43° C. The course of the reaction may be followed by adding 50 ml. of saturated potassium chloride solution to a 50 ml. sample of the suspension taken about 15 minutes after the start of feed. A copious precipitate of a curdy white solid should be obtained. If not, the temperature may be raised to 45° C. to start the reaction. Addition continues until all of the ethyl acrylate has been added. As soon as all of the ethyl acrylate has been added and the temperature begins to fall, the temperature is raised to about 50° C. and maintained between 48° and 52° C. for one hour. The dispersion is then cooled to about 33° C. and filtered through felt into a suitable storage container. The dispersion typically will have a solids content of 30 to 34%.

The sodium lauryl sulfate of the procedures is a mixture of sodium alkanol sulfates containing 10–16 carbon atoms and predominates in sodium dodecyl sulfate.

Example I

Material prepared as described in Procedure A was diluted with distilled water to a concentration of 25% solids and 70 parts of this dispersion were mixed with 30 parts of a dispersion of polyethyl acrylate prepared as described in Procedure B which had also been diluted to 25% solids with distilled water. The resulting mixture was then used to coat both sides of a polyethylene terephthalate film which was cast at a thickness of about 0.075 inch after the manner described in Example IV of Alles U.S. Patent 2,779,684. The coated film was then biaxially stretched at about 95° C. first longitudinally and then laterally about 3 times in unit length and width to provide a final thickness of about .007-inch with a copolymer mixture coating weight of about 7 to 8 mg. per square decimeter on each side. The film was then heat-set while under restraint at about 188° C. and then coated on both sides with a thin anchoring substratum layer of gelatin (0.5 mg./dm.²). After coating, the film was allowed to shrink under low tension at about 130–135° C. On one gelatin surface there was coated a gelatin, non-halation dye-containing layer and on the other side a gelatino-silver halide photographic emulsion of the lithographic type comprising 30 mole percent AgBr and 70 mole percent AgCl at a coating weight of 50.6 mg./dm.² of silver and 55 mg./dm.² of gelatin. The film was tested in comparison with a control film prepared identically with the same photographic emulsion, except that the initial coatings on the film base consisted of 100% of the copolymer dispersion prepared by Procedure A.

Samples of both films were given a 20-second, intensity scale, sensitometric, step-wedge exposure to a white light, tungsten source. The exposure in each successive step increased by the fourth root of two. The exposed samples were developed for 2¼ minutes in the following lithographic developer:

| | |
|---|---|
| Water ml | 500 |
| $Na_2SO_3$ anhydrous g | 30 |
| Paraformaldehyde g | 7.5 |
| $NaHSO_3$ g | 2.2 |
| Boric acid g | 7.5 |
| Hydroquinone g | 22.5 |
| Potassium bromide g | 1.6 |
| Water to make, 1 liter. | |

After fixing, washing, and drying in the conventional manner the sensitometric properties of the two films were found to be identical within the limits of experimental error. Both films were found to have satisfactory wet anchorage when tested by exposing samples to white light, processing as above, and, after washing, but before drying, scribing two lines 2 inches long and ½ inch apart through the emulsion layer with a phonograph needle and rubbing across the marks with a rubber squeegee. Neither coating showed any tendency to peel from the base. On testing the dry anchorage, however, the experimental film with the mixture of two dispersions used in the sub-coating was definitely superior to the control. The test for dry anchorage was made by taking three groups of 10 samples of each coating, exposing them to white light, and processing as described above. The processed and dried samples were then scored with a phonograph needle to produce four parallel scratches through the emulsion layer ¼ inch apart. A series of liners were then scored across these lines at an angle of about 60° to them and about ¼ inch apart to produce 3 lines of 9 rhomboid figures scratched through the emulsion layer. A piece of cellophone, pressure-sensitive, adhesive tape is then pressed down over the scored area and a loose end of the tape grasped at about a 90° angle to the film surface. The tape is pulled up briskly and an arbitrary measure of adhesion obtained by comparing each group of 10 samples with a graded series of standards prepared with films having excellent to very poor anchorage. The arbitrary scale ranges from a value of 0 for excellent anchorage to 10 for very poor anchorage. Tested in this manner, the ten samples of experimental film having a mixture of polymers in the sub-coating were rated from 0 to 2 on the arbitrary scale while the control rated from 6 to 7.

Example II

A film was made in a manner similar to the film of Example I, except that the thickness of the base as cast was .045 inch before and .004 inch after stretching, the mixed polymer subbing dispersion consisted of a 90:10 mixture of 12.5% solids dispersions of vinylidene chloride/methyl acrylate/itaconic acid and polyethyl acrylate made as described in Procedures A and B, and coated at a coating weight of about 3 mg./dm.², the non-halation coating comprised a 3.58 gelatin/polyethyl acrylate mixture prepared by mixing a gelatin dispersion with polyethyl acrylate prepared as in Procedure B, and the silver halide emulsion was prepared in the same manner as that described in Example I of assignee's U.S. patent application Nottorf U.S. Ser. No. 134,109 filed Aug. 28, 1961, (U.S.P. 3,325,286, June 13, 1967). When tested as described in Example I, the results were equivalent to those obtained in Example I.

Example III

A series of films was prepared similar to the film of Example I in which the following ratios of the dispersions of Procedures A and B were mixed and coated at final coating weights of both 7–8 mg./dm.² and 3.5–4 mg./dm.².

| Dispersion of Procedure A (parts) | Dispersion of Procedure B (parts) |
|---|---|
| 95 | 5 |
| 90 | 10 |
| 85 | 15 |
| 80 | 20 |
| 75 | 25 |
| 70 | 30 |
| 65 | 35 |
| 60 | 40 |

When tested as described in Example I all of the films displayed essentially the same photographic properties.

Of the films coated at a coating weight of 7–8 mg./dm.², those employing from 10 to 35 parts of the dispersion of Procedure B, all exhibited better dry anchorage than the control. Of the films coated at 3.5–4 mg./dm.² those employing from 15 to 40 parts of the dispersion of Procedure B all exhibited better dry anchorage than the control.

Example IV

A film was made in a manner similar to the film of Example II and coated on both sides with the subbing dispersion of that example followed by a thin, anchoring, substratum layer of gelatin applied at a coating weight of 0.5 mg./dm.². One side of the film was coated with a layer of 125 mg./dm.² of a mixture of 66.67 parts of gelatin and 33.33 parts of polyethyl acrylate prepared by mixing a gelatin dispersion with polyethyl acrylate prepared as in Procedure B. The other side of the film was coated with a blue-sensitive, photographic, silver bromoiodide emulsion prepared in a manner identical to that described in assignee's application of Cohen and Shacklett U.S. Ser. No. 122,653 filed July 10, 1961, U.S.P. 3,252,801, May 24, 1966, in which the silver halide consisted of 3.14 mole percent silver iodide and 96.86 mole percent silver bromide and the binder for the emulsion was a mixture of 55.6 parts gelatin, 27.7 parts polyethyl acrylate, and 16.7 parts of polyvinyl pyrrolidone (on a solid basis). The coating weight of the emulsion layer was 63 mg./dm.² of silver and 142 mg./dm.² of total binder. This film and a control film made in an identical fashion, except that the copolymer substratum layer contained 100% of the copolymer of Procedure A were exposed as in Example I, except that the exposure in each successive step varied by the square root of two. The films were then developed for three minutes in a developer consisting of:

| | G. |
|---|---|
| Monomethyl-p-aminophenolsulfate | 2.5 |
| $Na_2SO_3$ (desiccated) | 50. |
| Hydroquinone | 2.5 |
| $Na_2CO_3 \cdot H_2O$ | 24.0 |
| Borax | 14.0 |
| KBr | 0.5 |
| Water to make, 1 liter. | |

After development, the films were treated in a conventional hardening and fixing bath, washed, and dried. The sensitometric properties of the films were found to be identical within the limits of experimental error. When wet and dry anchorage were tested as in Example I, the film made with the polyethyl acrylate addition to the copolymer substratum exhibited superior dry anchorage and equivalent wet anchorage as compared to the control.

Example V

A dispersion of polymethyl acrylate was prepared by substituting an equivalent quantity of methyl acrylate for ethyl acrylate in Procedure B, and was diluted to 25% solids with distilled water. The dispersion made according to Procedure A was diluted with water to a concentration of 25% solids, and 70 parts of this dispersion were mixed with 30 parts of the diluted polymethyl acrylate dispersion. The resulting mixture was coated on both surfaces of a polyethylene terephthalate film that was cast at a thickness of about 0.075 inch as described in Example IV of Alles U.S.P. 2,779,684 and biaxially stretched, and heat set as described in Example I hereof. Both surfaces of the film were coated with a thin anchoring substratum layer of gelatin (0.5 mg./dm.$^2$). After coating, the film was allowed to shrink under low tension at about 130–135° C. On one gelatin surface there was coated a gelatin, antihalation dye-containing layer and on the other side a gelatino-silver halide photographic emulsion of the lithographic type described in Example I. The film was tested in comparison with a control film having the same photographic emulsion, except that the initial coatings on the film base were of 100% of the copolymer dispersion prepared by Procedure A.

Both samples were exposed as described in Example I and were developed for 2¼ minutes in the developer of Example I. After fixing, washing, and drying, the sensitometric properties of the two films were found to be substantially identical. Both films had satisfactory wet anchorage when tested by the method described in Example I. Neither coating showed any tendency to peel from the base. On testing the dry anchorage, however, the experimental film with the mixture of the two dispersions used in the sub-coating was definitely superior to the control. The test for dry anchorage was the same as that described in Example I. Tested in the manner there described, the ten samples of experimental film having a mixture of polymers in the sub-coating was rated from 0 to 2 on the arbitrary scale, which was excellent or very good, while the control rated from 6 to 7, which was fair.

Example VI

A film was made in a manner similar to the film of Example I, except that the thickness of the base after stretching was 0.004 inch, the mixed polymer subbing dispersion was a 90:10 mixture of 12.5% solids dispersions of vinylidene chloride/methyl acrylate/itaconic acid and polymethyl acrylate made as described in Procedure A and Example V, respectively, and coated to a weight of about 3 mg./dm.$^2$, the non-halation coating was a 3.58/1 gelatin/polymethyl acrylate mixture prepared by mixing an equeous gelatin dispersion with polymethyl acrylate prepared as in Example V, and the aqueous silver halide emulsion was made as described in Example I of assignee's Nottorf U.S. application Ser. No. 134,109 filed Aug. 28, 1961 U.S. Patent No. 3,325,286. When tested as described in Example I, the results were equivalent to those obtained in Example V.

Example VII

A series of films similar to that of Example I was made, except that the polymethyl acrylate of Example V was used instead of polyethyl acrylate. The dispersions of Procedures A and B were mixed in the ratios listed in Example III. The series of films was coated at final coating weights of both 7–8 mg./dm.$^2$ and 3.5–4 mg./dm.$^2$. When tested as described in Example I, all of the films displayed essentially the same photographic properties.

Of the films having a coating weight of 7–8 mg./dm.$^2$, those employing from 10 to 35 parts of the dispersion of Procedure B exhibited better dry anchorage than the control. Of the films coated at 3.5–4 mg./dm.$^2$, those employing from 15–40 parts of the dispersion exhibited better dry anchorage than the control.

Example VIII

A film was made in a manner similar to that of Example II, except that a dispersion of polymethyl acrylate was used in place of polyethyl acrylate. The film was coated on both sides with the subbing dispersion as in that example followed by a thin, anchoring, substratum layer of gelatin applied at a coating weight of 0.5 mg./dm.$^2$. One side of the film was coated with a layer of 125 mg./dm.$^2$ of a mixture of 66.67 parts of gelatin and 33.33 parts of a polymethyl acrylate dispersion prepared by mixing a gelatin dispersion with polymethyl acrylate prepared as in Example V. The other side was coated with a blue-sensitive, photographic, silver bromoiodide emulsion prepared as described in Example IV. The coating weight of the emulsion layer was 63 mg./dm.$^2$ of silver and 142 mg./dm.$^2$ of total binder. This film and a control film, made in an identical manner except that the copolymer substratum layer contained 100% of the copolymer of Procedure A, were exposed as in Example I, except that the exposure in each successive step varied by the square root of two. The films were developed for three minutes in the developer of Example IV. After development, the films were treated in a conventional hardening and fixing bath, washed and dried. The sensitometric properties of the films were found to be substantially identical. When the anchorage was tested as in Example I, the films with the polymethyl acrylate addition to the copolymer substratum had superior dry anchorage and equivalent wet anchorage, as compared with the control film.

Example IX

A dispersion of polybutyl acrylate was prepared according to Procedure B, by substituting an equivalent quantity of butyl acrylate for the ethyl acrylate, and was diluted to 25% solids with distilled water. A dispersion prepared as described in Procedure A was diluted with water to a concentration of 25% solids, and 70 parts of this dispersion were mixed with 30 parts of the diluted polybutyl acrylate dispersion. The resulting mixed dispersion was coated on each side of a polyethylene terephthalate film described in Example IV of Alles U.S. Patent No. 2,779,684. The coated film was biaxially stretched and heat set as described in Example I. The film was further coated on both surfaces with a substratum of gelatin (0.5 mg./dm.$^2$). After coating, the film was allowed to shrink under low tension at about 130–135° C. On one gelatin substratum there was coated a gelatin, antihalation dye-containing layer and on the other there was coated a gelatino-silver halide photographic emulsion as described in Example I. The photographic film was tested in comparison with a control film having the same photographic emulsion but the copolymer coating consisted of 100% of the copolymer of Procedure A.

Both photographic films were exposed and developed for 2¼ minutes as described in Example I. After fixing, washing, and drying, the sensitometric properties of the two films were found to be substantially identical. Both films had satisfactory wet anchorage when tested by the method of Example I. Neither coating showed any tendency to peel from the base. The dry anchorage of the experimental film with the mixture of the two dispersions in the sub-coating, however, was definitely superior to the control. Tested in the manner of Example I, the ten samples of experimental film with the mixture of polymers in the sub-coating was rated from 0 to 2 on the arbitrary scale, which was excellent or very good, while the control rated from 6 to 7 (fair).

Example X

A film made as described in Example I, except that the oriented base had a thickness of 0.004 inch, the mixed polymer dispersion of a 90:10 mixture of 12.5% solids dispersions of vinylidene chloride/methyl acrylate/itaconic acid and polybutyl acrylate, made as described in Procedure A and Example IX, respectively, was coated to a coating weight of about 3 mg./dm.$^2$. The antihalation coating was a 3.58/1 gelatin/polybutyl acrylate mixture made as set forth in Example IX, and the silver halide emulsion was made as described in Example I of assignee's Nottorf U.S. application Ser. No. 134,109 filed Aug. 28, 1961 (U.S. Patent No. 3,325,286). When tested as described in Example I, the results were equivalent to those obtained in Example IX.

Example XI

A series of films was made as described in Example I, except that polybutyl acrylate of Example IX was used instead of polyethyl acrylate. The dispersions were mixed in the ratios listed in Example III. The series of films were coated to weights of both 7–8 mg./dm.$^2$ and 3.5–4 mg./dm.$^2$. When tested as described in Example I, all of the films displayed essentially the same photographic properties.

The films having a coating weight of 7–8 mg./dm.$^2$ and containing 10–35 parts of the polybutyl acrylate dispersion had better dry anchorage than the control. Of the films coated at 3.5–4 mg./dm.$^2$, those having 10–40 parts of the polybutyl acrylate dispersion exhibited better dry anchorage than the control.

Example XII

A film made as described in Example II except that polybutyl acrylate was used in place of polyethyl acrylate, was coated on both surfaces with the subbing dispersion and then with a thin substratum of gelatin applied at a coating weight of 0.5 mg./dm.$^2$. One gelatin sublayer was coated with a layer of 125 mg./dm.$^2$ of a mixture of 66.67 parts of gelatin and 33.33 parts of a polybutyl acrylate dispersion and made by mixing a gelatin dispersion with the polybutyl acrylate of Example IX. The other gelatin surface was coated with the blue-sensitive, photographic, silver bromoiodide emulsion of Example IV. The coating weight of the emulsion was 63 mg./dm.$^2$ of silver and 142 mg./dm.$^2$ of total binder. This film and a control film, made in an identical manner but containing 100% of the copolymer of Procedure A, were exposed as in Example I, except that the exposure in each successive step varied by the square root of two. The films were developed for three minutes in the developer described in Example IV. After development, the films were treated in a conventional hardening and fixing bath, washed and dried. The sensitometric properties of the films were found to be substantially identical. When the wet and dry anchorage were tested as in Example I, the film with the polybutyl acrylate addition had superior dry anchorage and equivalent wet anchorage when compared with the control film.

Example XIII

A dispersion of polybutyl methacrylate was prepared as described in Procedure B, by substituting an equivalent quantity of butyl methacrylate for the ethyl acrylate, and was diluted with distilled water to 25% solids content. Material prepared as described in Procedure A was diluted with water to a concentration of 25% solids and 70 parts of this dispersion were mixed with 30 parts of the diluted polybutyl methacrylate dispersion. The resulting mixture was used to coat both surfaces of a polyethylene terephthalate film made as described in Example IV of Alles U.S.P. 2,779,684, and biaxially stretched and heat set as described in Example I. The film was coated on both surfaces with a thin anchoring substratum layer of gelatin (0.5 mg./dm.$^2$). After coating, the film was allowed to shrink under low tension at about 130–135° C. On one gelatin surface there was coated a gelatin, non-halation dye-containing layer and on the other side a gelatino-silver halide photographic emulsion as described in Example I. The film was tested in comparison with a control film prepared identically with the same photographic emulsion, except that the initial coatings on the film base consisted of 100% of the copolymer dispersion prepared by Procedure A.

Both photographic films were exposed and developed for 2¼ minutes in the developer and as described in Example I. After fixing, washing and drying in the conventional manner, the sensitometric properties of the two films were found to be substantially identical. Both films were found to have satisfactory wet anchorage when tested by the method of Example I. Neither coating showed any tendency to peel from the base. The dry anchorage of the experimental film with the mixture of the two dispersions used in sub-coating, however, was definitely superior to the control. Tested in the manner of Example I, the ten samples having a mixture of polymers in the sub-coating rated from 0 to 2 on the arbitrary scale, which was excellent or very good, while the control rated from 6 to 7, which was fair.

Example XIV

A film made as described in Example I, except that the thickness of the base after stretching was 0.004 inch and the mixed polymer subbing dispersion was a 90:10 mixture of 12.5% solids dispersions of vinylidene chloride/methyl acrylate/itaconic acid and polybutyl methacrylate made as described in Procedure A and Example XIII, respectively, and coated to a weight of about 3 mg./dm.$^2$. The antihalation coating was a 3.58/1 gelatin/polybutyl methacrylate mixture made by mixing an aqueous gelatin dispersion with the polybutyl methacrylate dispersion, and the silver halide emulsion was made as described in Example I of assignee's Nottorf U.S. application Ser. No. 134,109 filed Aug. 28, 1961 (U.S.P. 3,325,286). When tested as described in Example I, the results were equivalent to those obtained in Example XIII.

Example XV

A series of films was made as described in Example I, except that the polybutyl methacrylate of Example XIII was used instead of polyethyl acrylate, and the dispersions were mixed in the ratios listed in Example III. The series of films was coated to weights of both 7–8 mg./dm.$^2$ and 3.5–4 mg./dm.$^2$. When tested as described in Example I, all of the films displayed essentially the same photographic properties.

Of the films coated at a coating weight of 7–8 mg./dm.$^2$, those employing from 10–35 parts of the dispersion of Procedure B had better dry anchorage than the control. Of the films coated at 3.5–4 mg./dm.$^2$, those employing from 15 to 40 parts of the dispersion had better dry anchorage than the control.

Example XVI

A film was made as described in Example II, except that polybutyl methacrylate was used in place of polyethyl acrylate. The film was coated on both surfaces with the dispersion and then with a gelatin to a coating weight of 0.5 mg./dm.$^2$. One gelatin surface was coated to a weight of 125 mg./dm.$^2$ with a mixture of 66.67 parts of gelatin and 33.33 parts of a polybutyl methacrylate dispersion made by mixing a gelatin dispersion with polybutyl methacrylate of Example XIII. The other gelatin surface was coated with the blue-sensitive, photographic, silver bromoiodide emulsion of Example IV to a weight of 63 mg./dm.$^2$ of silver and 142 mg./dm.$^2$ of total binder. This film and a control film, made in an identical manner except that the copolymer substratum layer contained 100% of the copolymer of Procedure A, were exposed as in Example I, except that the exposure in each successive step varied by the square root of two. The films were developed for three minutes in the developer of Example IV. After development, the films were treated in a conventional hardening and fixing bath, washed and dried. The sensitometric properties of the films were found to be substantially identical. When wet and dry anchorage was tested as in Example I, the film with the polybutyl methacrylate addition to the copolymer substratum exhibited superior dry anchorage and equivalent wet anchorage when compared with the control film.

The film support for the emulsion layers used in the novel process may be any suitable transparent plastic. For example, the cellulosic supports, e.g., cellulose acetate, cellulose triacetate, cellulose acetate butyrate, etc., may be used. Polymerized vinyl compounds, e.g., copolymerized vinyl acetate and vinyl chloride, polystyrene, and polymerized acrylates may also be mentioned. The film formed from the polyesterification product of a dicarboxylic acid and a dihydric alcohol made according to the teachings of Alles, U.S. Patent 2,779,684 and the patents referred to in the specification of that patent are eminently satisfactory. Other suitable supports are the polyethylene terephthalate/isophthalates of British Patent 766,290 and Canadian Patent 562,672 and those obtainable by condensing terephthalic acid and dimethyl terephthalate with propylene glycol, diethylene glycol, tetramethylene glycol or cyclohexane 1,4-dimethanol (hexahydro-p-xylene alcohol). The films of Bauer et al. U.S. Patent 3,052,543 may also be used. The above polyester films are particularly suitable because of their dimensional stability.

In addition, the mixed polymer subbing compositions of the invention may be applied to paper and cloth.

The subbing compositions of the present invention are ideally suited for the reception of gelatin coatings, e.g., gelatin subbing treatments, non-halation layers and photographic emulsions.

In place of part or all of the gelatin other natural or synthetic water-permeable organic colloid binding agents can be used in the intermediate or photographic emulsion layers coated on the substratum layers of the present invention. Such agents include water-permeable or water-soluble polyvinyl alcohol and its derivatives, e.g., partially hydrolyzed polyvinyl acetates, polyvinyl ethers, and acetals containing a large number of extralinear

groups; hydrolyzed interpolymers of vinyl acetate and unsaturated addition polymerizable compounds such as maleic anhydride, acrylic and methacrylic acid ethyl esters, and styrene. Suitable mixed colloid emulsions are described in assignees pending applications Nottorf Ser. Nos. 94,989 (U.S.P. 3,142,568, July 28, 1964) and 134,109 filed Mar. 13, 1961 and Aug. 28, 1961 (U.S.P. 3,325,286), respectively, and Cohen and Shacklett Ser. Nos. 122,653 and 176,140, filed July 10, 1961 (U.S.P. 3,252,801, May 24, 1966) and Feb. 27, 1962 (U.S.P. 3,203,804, Aug. 31, 1965) respectively. The useful polyvinyl acetals include polyvinyl acetaldehyde acetal, polyvinyl butyraldehyde acetal and polyvinyl sodium o-sulfobenzaldehyde acetal. Other useful colloid binding agents include the poly-N-vinyllactams of Bolton U.S. Patent 2,495,918, the hydrophilic copolymers of N-acrylamido alkyl betaines described in Shacklett U.S. Patent 2,833,650 and hydrophilic cellulose ethers and esters.

In addition to serving as substratum anchoring layers for photographic coatings, the coatings of the present invention also provide strongly adherent, flexible substrata for drafting film coatings, e.g., the urea-formaldehyde and melamine formaldehyde coatings of Van Stappen 2,964,-423 and the matted acrylic coatings of Moede U.S. application Ser. No. 339,849 filed Jan. 24, 1964 (U.S.P. 3,353,958, Nov. 21, 1967).

The drafting film coatings of 2,964,423 contained as toothing agents silica, ground glass, titanium oxide, chalk, talc, diatomaceous earth and magnesium carbonate with average particle sizes from 0.1 to 10 and preferably 0.2 to 4 microns.

The matted acrylic coatings of Moede 3,353,958 contained uniformly dispersed, finely-divided, discrete particles of a water-insoluble, translucence-producing solid matting agent having an average particle size from about 0.1 to 10.0 microns. Suitable matting agents disclosed in this patent, silica hydrosols, silicon dioxide, titanium dioxide and starch.

The subbing compositions and/or subsequent coatings can be applied to the web supports or films by any method known to the art, e.g. dip or skim coating, or coating with rollers. Suitable coating methods are shown in Heilman U.S. 3,025,828, Wamsley U.S. 3,038,441, Brandsma et al. U.S. 3,063,868, and Haley U.S. 3,082,144. Various coating aids and surfactants may be added in the manner known to the art, but must be compatible with the surfactants, if any, already present and not deleterious to subsequently applied coatings, e.g. photographic emulsions.

The subbing compositions may contain various pigments and dyes for various purposes, e.g., carbon black, barium sulfate, titanium dioxide, zinc oxide, magnesium oxide, silicon dioxide, phthalocyanines and other organic and inorganic pigments can be used as well as various dyes, e.g. among the dyes useful in the invention are Fuchsine (C.I. 42510), Auramine Base (C.I. 41000B), Calcocid Green S (C.I. 44090), Para Magenta (C.I. 42500), Tryparosan (C.I. 42505), New Magenta (C.I. 42520), Acid Violet RRL (C.I. 42425), Red Violet 5RS (C.I. 42690), Nile Blue 2B (C.I. 51185), New Methylene Blue GG (C.I. 51195), C.I. Basic Blue 20 (C.I. 42585), Iodine Green (C.I. 42556), Night Green B (C.I. 42115), C.I. Direct Yellow 9 (C.I. 19540), C.I. Acid Yellows 17 (C.I. 18965), C.I. Acid Yellow 29 (C.I. 18900), Tartrazine (C.I. 19140), Supramine Yellow G (C.I. 19300), Buffalo Black 10B (C.I. 27790), Naphthalene Black 12R (C.I. 20350), Fast Black L (C.I. 51215), and Ethyl Violet (C.I. 20350), and Ethyl Violet (C.I. 42600).

It is an advantage of the present invention that it permits the formation of water-proof films for photographic film base or drafting films. A further advantage is that the invention supplies coatings which are firmly adherent in both the wet and dry states to a wide variety of natural and synthetic polymers. A still further advantage is the fact that the coatings of the present invention may be altered readily to provide films suited to a variety of different uses. A still further advantage is the fact that the polymers used in the coatings are readily and economically prepared by conventional processes. The mixed homopolymer/vinylidene chloride copolymer substratum has greater adherence than the vinylidene chloride copolymers to polyester film bases and water-permeable colloid layers while retaining equivalent resistance to organic solvents used in staging lacquers, which is an important advantage.

I claim:
1. A hydrophobic organic polymer film base bearing on at least one surface a substratum comprising a mixture of:
(a) a vinylidene chloride/alkyl acrylate/itaconic acid copolymer wherein alkyl contains 1–4 carbon atoms and said components are present in the respective amounts 35 to 96%, 3.5 to 64.5%, and 0.5 to 25%; and
(b) a homopolymer of an acrylate ester selected from the group consisting of alkyl acrylates and methacrylates, wherein alkyl contains 1–14 carbons atoms, said homopolymer having a glass transition temperature not more than 20° C.; said components (a) and (b) being present in the respective amounts by weight of 90 to 60 and 10 to 40.

2. A film base according to claim 1 wherein said polymer is a polyethylene terephthalate.

3. A photographic film element comprising a hydrophobic organic polymer film base bearing, in order, on at least one surface:
  (1) a substratum comprising a mixture of
    (a) a vinylidene chloride/alkyl acrylate/itaconic acid copolymer wherein alkyl contains 1–4 carbon atoms and said components are present in the respective amounts 35 to 96%, 3.5 to 64.5%, and 0.5 to 25% by weight; and
    (b) a homopolymer of an acrylate ester selected from the group consisting of alkyl acrylates and methacrylates, wherein alkyl contains 1–14 carbon atoms, said homopolymer having a glass transition temperature not more than 15° C.;
    said components (a) and (b) being present in the respective amounts by weight of 90 to 60 and 10 to 40;
  (2) a water-permeable colloid anchor substratum, and
  (3) a water-permeable colloid-silver halide emulsion layer.

4. An element according to claim 3 wherein constituent (b) is polyethyl acrylate.

5. A drafting film comprising a hydrophobic organic polymer film base bearing on at least one surface a mixture of:
  (a) a vinylidene chloride/alkyl acrylate/itaconic acid copolymer where alkyl contains 1–4 carbon atoms, and said components are present in the respective amounts of 35 to 96%, 3.5 to 64.5%, and 0.5 to 25%, by weight; and
  (b) a homopolymer of an acrylate ester selected from the group consisting of alkyl acrylates and methacrylates wherein alkyl contains 1–14 carbon atoms, said homopolymer having a glass transition temperature not more than 20° C.;
  said components (a) and (b) being present in the respective amounts by weight of 90 to 60 and 10 to 90, and on said surface
  an adherent drafting layer comprising a solid toothing agent having an average particle size from 0.1 to 10.0 microns and a polymeric binding agent therefor.

References Cited
UNITED STATES PATENTS

| | | | |
|---|---|---|---|
| 2,698,235 | 12/1954 | Swindells | 96—87 |
| 2,991,260 | 7/1961 | Auer et al. | 260—29.6 |
| 3,043,695 | 7/1962 | Alles | 96—83 |
| 3,227,576 | 1/1966 | Van Stappen | 117—161 |

NORMAN G. TORCHIN, Primary Examiner

R. H. SMITH, Assistant Examiner

U.S. Cl. X.R.

117—161; 260—29